LOGIC CIRCUITS WITH INVERSION

Filed Nov. 14, 1960 2 Sheets-Sheet 1

INVENTORS
HAROLD L. ERGOTT, JR.
STATHIS G. LINARDOS
BY RICHARD T. O'CONNELL
Lester W. Clark
ATTORNEY INVENTORS
HAROLD L. ERGOTT, JR.
STATHIS G. LINARDOS
RICHARD T. O'CONNELL
BY Lester H. Clark
ATTORNEY United States Patent Office 3,152,264

Patented Oct. 6, 1964

3,152,264

LOGIC CIRCUITS WITH INVERSION

Harold L. Ergott, Jr., Apalachin, Stathis G. Linardos, Vestal, and Richard T. O'Connell, Owego, N.Y., assignors to International Business Machines Corporation, New York, N.Y., a corporation of New York Filed Nov. 14, 1960, Ser. No. 68,707
5 Claims. (Cl. 307—88.5)

This invention relates to logic circuits for use in high speed computers, and particularly to logic circuits which are capable of carrying out inversion operations.

The invention is described herein as applied to a particular type of logic circuit utilizing Esaki diodes and known in the art as a Goto circuit (see for example the article beginning on page 1 of Electronic News for December 21, 1959, and entitled "Esaki Diode Computer Seen Closest to Brain"). However, in its broader aspects, the invention is applicable to other types of circuits employing bistable or polystable units, where an inversion of a particular potential condition is required.

The Goto logic circuit uses as a fundamental building block an arrangement which has come to be known in the art as a Goto stage, consisting of two Esaki diodes connected in series between two clock pulse input terminals and poles in the same direction. The potentials at the clock pulse input terminals swing between background potentials which are equal for both terminals (particularly, ground potential) and signal potentials which are oppositely poled with respect to ground, but which are synchronized with each other. Input potentials are applied through an input resistor to the common junction of the two diodes, which is commonly termed the node of the Goto stage. Output potentials are coupled from the same node through an output resistor. Commonly, each input and output resistor couples the nodes of adjacent Goto stages in a logic chain or shifting register. The clock pulses for adjacent Goto stages in a chain overlap one another, but are shifted in phase with respect to one another so that a signal cascading through the chain passes from one Goto stage to the next during the overlap. In order to ensure directional transmission of data through a chain, it is necessary to use three-phase clock pulses for the successive stages. In other words, since the data is transmitted only during pulse overlaps, the overlap of any stage with its preceding stage must come before and be separated in time from the overlap with the following stage.

In the Goto logic circuits of the prior art, it has not been conveniently possible to provide inverse functions. It has therefore been necessary, in a computer using such logic circuits to provide one set of Goto stage chains for positive logic functions and a corresponding set of Goto stage chains for negative logic functions.

An object of the present invention is to provide an improved logic circuit for producing inverse functions.

Another object is to provide inverse function logic in a logic circuit using Goto stages.

The foregoing objects are attained in the circuits described herein, in which the nodes of successive Goto stages are coupled through memory means, e.g., a capacitor, in order to make the potential at the node of the second stage vary as an inverse function at the node of the first stage. It is essential that the characteristics of the memory means coupling the two Goto stages be carefully selected with relation to the resistance of the Esaki diodes and other impedance elements in the circuit. It is also essential that the overlap time of the clock pulses applied to successive stages be coordinated with the characteristics of the memory means and with the resistance and potential values employed.

Other objects and advantages of the invention will become apparent from a consideration of the following specification and claims, taken together with the accompanying drawings.

Figure 1:
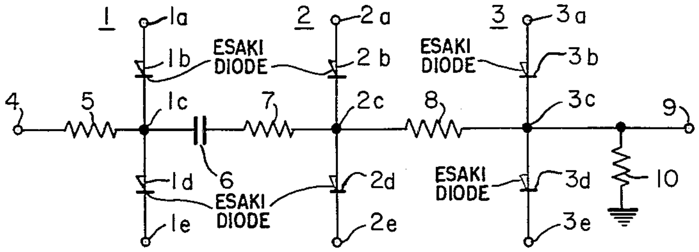
FIG. 1 is a wiring diagram of one form of logic circuit embodying the invention.
Figure 2:
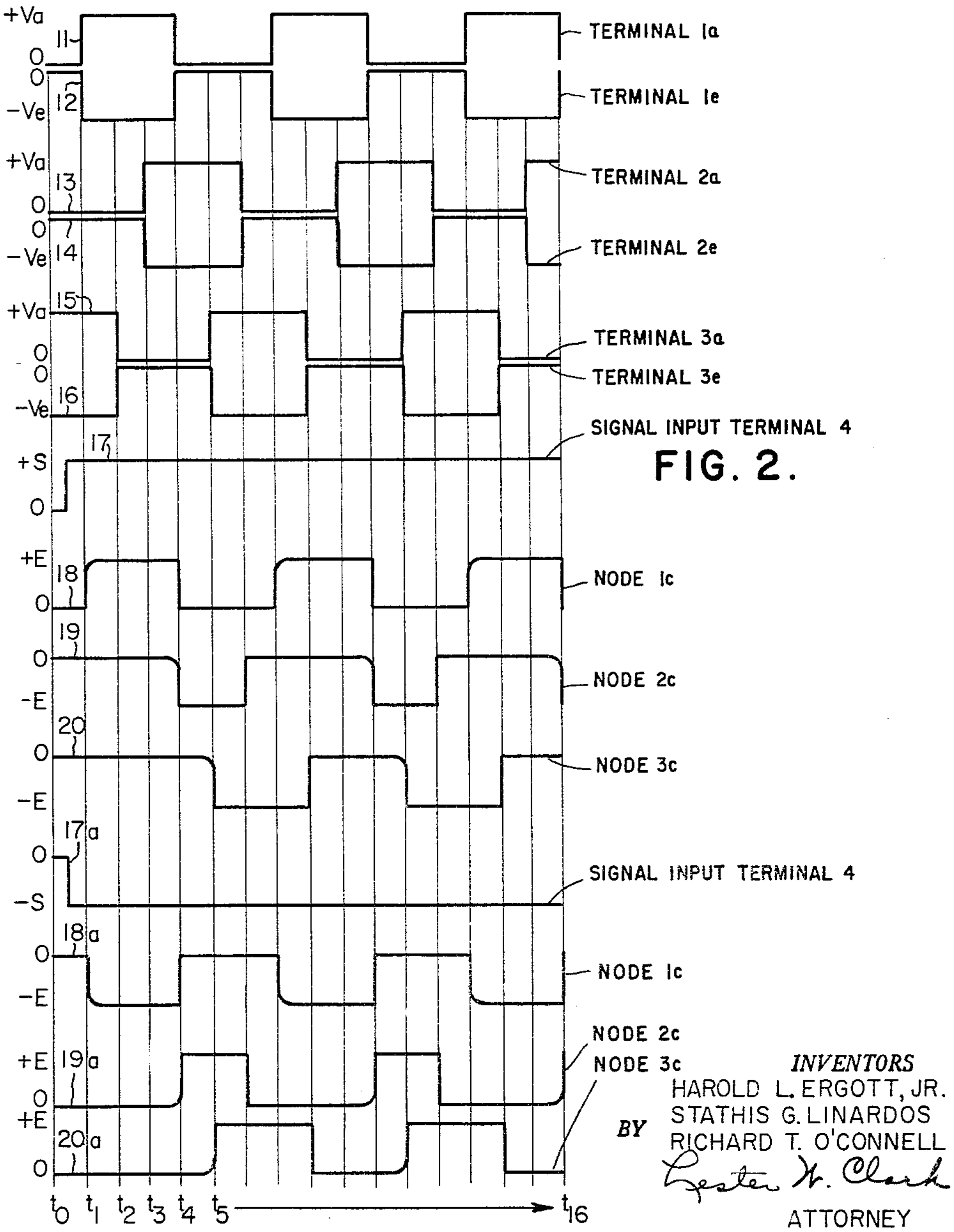
FIG. 2 is a graphical illustration of the variation with time of the clock pulses and other potentials in FIG. 1.
Figure 3:
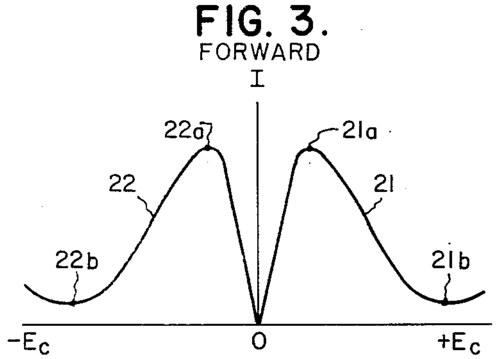
FIG. 3 is a graphical illustration of the characteristics of the two diodes forming a Goto stage in the circuit of FIG. 1, when the clock pulses are at their background potential.

*FIGS. 1 to 3*

The circuit of FIG. 1 includes three Goto stages respectively numbered 1, 2 and 3. Each stage comprises a positive clock input terminal *1a, 2a, 3a*; a first Esaki diode *1b, 2b, 3b*; a common junction or node *1c, 2c, 3c*; a second Esaki diode *1d, 2d, 3d* and a negative clock pulse input terminal *1e, 2e, 3e*.

A signal input terminal 4 is connected through a coupling resistor 5 to the node *1c*. Node *1c* is connected to node *2c* through a coupling capacitor 6 and a coupling resistor 7 connected in series. Node *2c* is connected to node *3c* through a coupling resistor 8. Node *3c* is connected to an output terminal 9 and is also connected through a load resistor 10 to ground.

FIG. 2 illustrates graphically the various potentials applied to the circuit of FIG. 1, beginning at a time $t_0$. Line 11 in FIG. 2 shows the clock potential at clock pulse input terminal *1a*. Line 12 shows the clock potential at clock pulse input terminal *1e*. Line 13 shows the clock pulse potential at clock pulse input terminal *2a*. Line 14 shows the clock pulse potential at clock pulse input terminal *2e*. Line 15 shows the clock potential at clock pulse input terminal *3a*. Line 16 shows the clock potential at clock pulse input terminal *3e*. Note that the clock pulses 11, 12; 13, 14; and 15, 16 are sequential and overlapping. As used in this specification, the word "sequential" with reference to pulses means that their wave fronts occur in sequence, whether or not the pulses overlap.

Line 17 shows one possible mode of variation of the input potential at terminal 4. Lines 18, 19 and 20, show the concurrent variations in potential at nodes *1c, 2c* and *3c*, respectively, as the potential at terminal 4 follows the mode of variation illustrated in line 17. Line *17a* shows another possible mode of variation of the input potential at terminal 4 and lines *18a, 19a* and *20a* show the corresponding concurrent potential variations at nodes *1c, 2c* and *3c*, respectively.

FIG. 3 shows the current-potential characteristics of a pair of Esaki diodes such as the diodes *1b* and *1d* in stage 1 of FIG. 1, when the clock pulse potentials are both at zero.

The values on the horizontal axis in FIG. 3 shown as $E_c$, represent potentials at one of the nodes, such as the node *1c* of stage 1. The curve 21 represents the current-potential characteristic of the Esaki diode *1d* in FIG. 1. The curve 22 represents the current-potential characteristic of the Esaki diode *1b* in FIG. 1. FIG. 3 shows how the forward current through the diodes changes as the potential at the node *1c* changes. The curve 21 is a typical Esaki diode characteristic including a positive resistance portion between the origin and the point *21a*, a negative resistance portion between points 21*a* and 21*b*, and a positive resistance portion to the right of point 21*b*. The curve 22 is a mirror image of the curve 21, and appears in that fashion because its forward current varies along this characteristic as the potential at the node 1*c* swings in the negative direction. Except for being reversed left-to-right, curve 22 is another typical Esaki diode characteristic including a positive resistance portion between the origin and the point 22*a*, a negative resistance portion between points 22*a* and 22*b*, and another positive resistance portion to the left of the point 22*b*.

Figure 4:
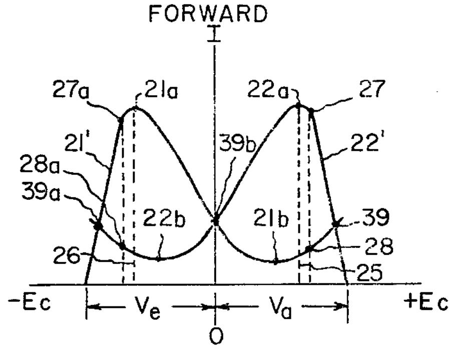
FIG. 4 is a graphical illustration similar to FIG. 3, but showing the characteristics when the clock pulses are at their signal potentials.
Figure 5:
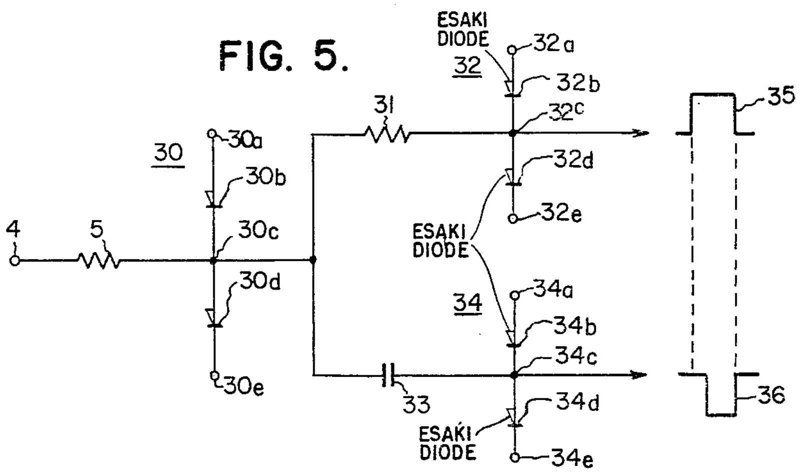
FIG. 5 is a wiring diagram of a modified form of circuit embodying the invention.
Figure 6:
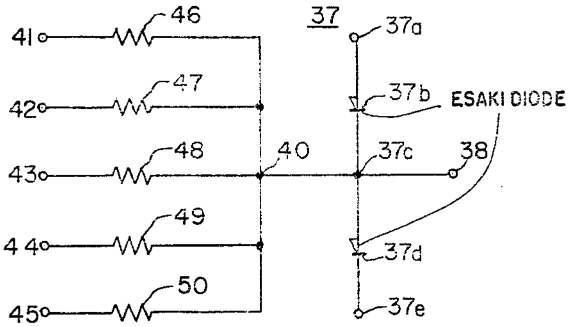
FIG. 6 is a wiring diagram of still another circuit embodying the invention.

In FIG. 4, the two characteristics 21 and 22 are shown shifted to new positions, and are now identified as 21′ and 22′, respectively. These curves show the ideal characteristics of the diodes 1*b* and 1*d* respectively, when the clock pulses 11 and 12 are at the values V*a* and V*e*, respectively (see FIG. 2). If the node 1*c* is then at 0 volts, the diodes are both forwardly biased, and both are at points in the negative resistance regions of their respective characteristics, which points are therefore unstable. The node 1*c* therefore tends to swing either to a potential more positive than that indicated in the drawing by the reference numeral 25, where both diodes are in stable positive resistance regions of their respective characteristics, or to a potential more negative than the potential represented in FIG. 4 by the numeral 26 where both diodes are also in stable positive resistance portions of their respective characteristics. In the absence of a load connected to the node 1*c*, the diodes would swing all the way to one or the other of the stable crossover points 39 or 39*a*. The presence of a load will bring the diodes into either the region between 27, 28 and 39, or the region between 27*a*, 28*a* and 39*a*. If no external potential is applied to node 1*c*, the direction in which the diodes swing is determined by the location of the crossover point 39*b* with respect to 0, it being understood that with any two physical diodes, it is practically impossible to have their characteristics cross exactly at 0 volts. Furthermore, if the two clock pulses potentials are not exactly matched, a similar swing in an indeterminate direction may occur. When a signal input potential is applied to terminal 4, it establishes the direction of swing of the potential of node 1*c* from zero.

Assume that the signal potential at input terminal 4 swings to a positive value E between the time $t_0$, and time $t_1$, as shown by line 17 in FIG. 1. The node 1*c* is at this time grounded through the low forward impedance of diode 1*d* and low reverse impedance of diode 1*b*, and although the potential of node 1*c* is close to ground, it is shifted to a positive value with respect to ground by the potential at terminal 4. Thereafter, at time $t_1$, the positive and negative clock pulse potentials $+V_a$ and $-V_e$ are applied to terminals 1*a* and 1*e*, respectively, shifting the characteristics of the two diodes so that they appear as shown in FIG. 4. The input current from terminal 4 acts at the beginning of the clock pulses to steer the two diodes to the right from the zero crossover point in FIG. 4. The particular value of potential at node 1*c* when the diodes are established in a stable state is determined by the external load connected to node 1*c*. In the present instance, assume that the load is sufficient to establish the node 1*c* at the potential represented by the points 27 and 28 in FIG. 4. The diode 1*b* is then in a high current conductive state, as shown by point 27, and the diode 1*d* is in a relatively low current conductive stage, as indicated by point 28. Both diodes are on positive resistance portions of their characteristics, so that the state of the Goto stage is stable. The excess current flowing through diode 1*b* charges capacitor 6, whose opposite terminal is grounded through resistor 7 and the low impedance of the diodes 2*b* and 2*d*. The potential at node 1*c* swings positive, following the line 18 in FIG. 2.

Note that, in the case of a stage supplied with an input signal through a resistive coupling, such as stage 1 of FIG. 1, it is desirable to have the input signal supplied at a time $t_0$ before the application of the clock pulses at time $t_1$. In this way, it is ensured that the direction in which the stage is switched at time $t_2$ is determined by the input signal polarity, and not by casual mismatches which may occur in the diode characteristics or in the amplitudes of the clock pulses 11 and 12. The input signal, by being made effective before the mismatch can come into play, can override the effect of the mismatch and establish the stage in its desired stable state.

At time $t_3$, the clock pulses are applied to terminals 2*a* and 2*e*, thereby switching stage 2 from the characteristic condition shown in FIG. 3 to that in FIG. 4. This switching requires a finite interval of time. The clock pulse applied to stage 2 must overlap the clock pulses applied to stage 1 by a time long enough to complete the switching of stage 2.

The capacitor 6 is made large enough so that during the interval between $t_3$ and $t_4$, that capacitor 6 is effective to hold node 2*c* at ground potential, regardless of any mismatch between the diodes 2*b* and 2*d* or between the positive and negative second stage clock pulses. The node 2*c* is at zero potential before time $t_3$, and the opposing clock pulses applied at that time are not sufficient to change the charge on the capacitor appreciably, as would be required to shift node 2*c* from zero. If the overlap time between $t_3$ and $t_4$ is short, the capacitor 6 can readily be made large enough to hold 2*c* at 0 until time $t_4$.

At time $t_4$, the clock pulses 11 and 12 applied at terminals 1*a* and 1*e* of stage 1 terminate. When these clock pulses 11 and 12 terminate, low impedance paths to ground are provided for the charge on the capacitor through the diodes 1*b* and 1*d*. The node 1*c* and the left hand terminal of capacitor 6 are thereby switched to ground potential. The capacitor 6 has been charged with its left hand terminal positive, so that when that left hand terminal is switched to ground potential, the right hand terminal switches negative with respect to ground, being held negative by the charge on the capacitor. The node 2*c* is thereby swung in a negative sense to the potential indicated at 27*a* in FIG. 4, at which potential diode 2*d* is in a high current state, and diode 2*b* is in a low current state. The potential at node 2*c* follows the line 19 in FIG. 2, in which the square waves swing negatively and appear inversely to the square waves of the curve 18, being also shortened in duration and having their wave fronts somewhat delayed in time.

The time constant of the charging circuit of capacitor 6 must be sufficiently small so that it can charge between time $t_1$ and time $t_3$ and must be sufficiently large so that the charge on the capacitor 6, or a susbtantial proportion of it, holds from time $t_3$ to time $t_4$.

The potential change at the node 2*c* is transferred to the node 3*c* of stage 3 (see line 20 in FIG. 2) when the clock pulses 15 and 16 are applied to the terminals 3*a* and 3*e*. Note that there is no delay between the initiation of the clock pulses 15 and 16 and the change in potential at the node 3*c*. This absence of delay is indicated by the fact that the pulses in the line 20 are in phase with the clock pulses 15 and 16. The delay between the initiation of the clock pulses 13 and 14 and the initiation of potential pulses 19 at node 2*c* is due to the capacitor 6, which tends to hold the node 2*c* at its previously established potential. Note that the potential pulses at node 3*c* are of the same polarity as the potential pulses at node 2*c*, there being no inversion through the coupling resistor 8. The pulses at node 3*c* are transmitted directly to an output terminal 9.

In selecting the values for capacitor 6 and resistor 7, it must be borne in mind that there are three distinct and different operating phases of the circuit and that the criteria for selection of the capacitance and resistance values are different in the three different phases. Consequently, it is necessary to select optimum values which represent a compromise between extreme values, one of which might be desirable for one of the three phases and the other desirable for a different one of the three phases.

The three phases may be defined as: (*a*) the capacitor charging phase, during which the clock pulses are applied to the stage preceding the capacitor, not to the following stage; (*b*) the overlap phase, during which clock pulses are applied to both stages; and (*c*) the capacitor discharging phase, during which clock pulses are applied only to the second stage.

During the capacitor charging phase, it is desirable to charge the capacitor as rapidly as possible, in order that the potential available for switching the following stage may be as large as possible. For that purpose, it would appear that the resistance of resistor 7 should be made as large as possible so to load the node 1*c* as little as possible and allow the charge on the capacitor 6 to build up rapidly. In the overlap phase, it is again desirable to have the resistance 7 as large as possible to prevent discharge of the capacitor 6 by a leakage current.

In the capacitor discharging phase, on the other hand, it becomes desirable to have the resistor 7 as small as possible. The reason for making resistor 7 small during this phase is to minimize the potential drop across it so that the major proportion of the charge stored in the capacitor 6 may be utilized for producing a maximum potential drop across the diode 2*b* or the diode 2*d*, as the case may be, thereby producing a maximum swing of the potential at the node 2*c*.

As a practical solution to this problem, it was found that with a clock frequency of about 10 kc., and with an overlap duration of 8 microseconds, a satisfactory compromise was obtained by eliminating the resistor 7, leaving only that small value of resistance which was present in the wire connections. The requirement for a high resistance at 7 during the overlap time may be reduced by shortening the overlap as far as is practically possible. Thus, it was found that for this frequency and a range of capacitance between 500 pfd. and 1000 pfd., the optimum operation was secured when the resistor 7 was eliminated completely. In that circuit, clock voltages of 150 millivolts were suitable with germanium diodes, and voltages of 250 millivolts with gallium arsenide diodes. Input signal voltages of about 60 millivolts were used.

Line 17*a* indicates that the input potential at terminal 4 may swing negatively with respect to ground, instead of positively as illustrated in line 17. The operation of the circuit under such conditions is analogous to the operation previously described. The variations of the potentials at nodes 1*c*, 2*c*, 3*c* under such conditions are shown by lines 18*a*, 19*a* and 20*a* in FIG. 2.

It will be readily understood that, in a typical case, the input signal at terminal 4 may swing between positive, ground and negative values, as dictated by the logic or other circuits which are driving that signal. The positive and negative signals shown in lines 17 and 17*a* are selected for purposes of illustration only.

Instead of using the capacitor 6 to secure inversion, it may be possible in many instances to utilize other energy storage devices or memory devices.

*FIG. 5*

This figure illustrates a circuit including a driving stage 30 coupled through a resistor 31 to an output stage 32. The driving stage 30 is also coupled through a capacitor 33 to an output stage 34. As in the case of FIG. 1, the several elements in each stage have been given reference numerals consisting of the number of the stage followed by the letter *a* for the positive clock pulse input terminal, the letter *b* for the diode adjacent that terminal, the letter *c* for the node, the letter *d* for the other diode, and the letter *e* for the negative clock pulse input terminal. As in FIG. 1, the stage 30 receives an input signal from terminal 4 through resistor 5. The transfer of the signal between the node 30*c* and the node 32*c* takes place without inversion, as in the case of the transfer between stages 2 and 3 in FIG. 1. The transfer between stage 30 and stage 34 takes place with inversion, corresponding to the transfer between stage 1 and stage 2 in FIG. 1. The output signal 35 from stage 32 is synchronized with the clock pulses applied thereto. The output signal 36 from stage 34 is also synchronized with the same clock pulses, except that its wave front or leading edge is delayed by the presence of the capacitor 33. This delay is well defined and is equal to the pulse overlap time between stages.

*FIG. 6*

This figure illustrates a modification of the invention including a stage 37 having its node 37C coupled to an output terminal 38. The node 37*c* is also connected to the common output terminal of a majority logic input assembly including five signal input terminals 41, 42, 43, 44 and 45. Terminals 41 to 45 are connected through resistors 46, 47, 48, 49 and 50 respectively to the terminal 40, so that their signals add and subtract algebraically at terminal 40. It is assumed that the input terminals 41 to 45 are driven by bistable Goto stages or other stages having similar characteristics.

The signal appearing at 38 may be transferred to other Goto stages through resistance coupling with inversion or through capacitive coupling with inversion as described above.

While we have set forth above a particular theory regarding the operation of the circuits described herein, it will be understood by those skilled in the art that many variables are concerned and that the theory expressed may be found upon subsequent investigation to be incorrect. It is therefore our intention that the invention not be limited to any particular theory of operation expressed herein.

While we have shown and described certain preferred embodiments of our invention, other modifications thereof will readily occur to those skilled in the art, and we therefore intend our invention to be limited only by the appended claims.

We claim:

1. Inverse function producing apparatus, comprising first and second bistable stages, each comprising first and second Esaki diodes, means connecting the anode of the first diode and the cathode of the second diode to a common junction, a positive clock pulse input terminal connected to the anode of the second diode, a negative clock pulse input terminal connected to the cathode of the first diode, an input terminal connected to the common junction, an output terminal connected to the common junction, means including a capacitor coupling the output terminal of the first stage to the input terminal of the second stage, means for applying concurrently to the respective clock pulse input terminals of the first stage clock pulses which shift in opposite senses from a common background potential, means for applying to the first stage input terminal an input signal shiftable from said background potential selectively to either of two inversely related potentials having opposite polarities with respect to said common background potential, said input signal preceding said first stage clock pulses and cooperating with the clock pulses to establish said first stage in one of two stable states characterized by one of said two inversely related potentials at said common junction and thereby to charge the capacitor with a charge of selected polarity, means for applying concurrently to the respective clock pulse input terminals of the second stage clock pulses which shift in opposite senses from said common background potential, said second stage clock pulses being shifted in phase with respect to the first stage clock pulses and being initiated after the charging of said capacitor but overlapping the first stage clock pulses, said capacitor cooperating with the second stage clock pulses after termination of the first stage clock pulses to discharge the capacitor and thereby to switch the second stage to the opposite one of said two stable states and to produce at the second stage common junction the opposite one of said two inversely related potentials.

2. Inverse function producing apparatus as defined in claim 1, in which said coupling means consists solely of said capacitor.

3. Inverse function producing apparatus as defined in claim 1, including a third bistable stage, and a resistor coupling the common junctions of the third and second bistable stages.

4. Inverse function producing apparatus, comprising:

(a) first and second bistable stages, each stage including a quantum mechanical tunneling device having an anode and a cathode;

(b) signal input means coupled to the anode of the first stage diode and shiftable between inversely related signal conditions;

(c) cyclically operating clock pulse input means coupled to the anodes of the two stages and effective to supply a series of clock pulses to each stage, the clock pulses for the second stage being delayed in time phase with respect to the clock pulses of the first stage;

(d) interstage coupling means comprising a capacitor connected between the anodes of the diodes in the two stages;

(e) said signal input means, said clock pulse input means, said diodes and said capacitor cooperating in response to a given signal condition at the first stage anode to produce an inversely related signal condition at the second stage anode.

5. Inverse function producing apparatus, comprising:

(a) first and second bistable stages, each stage including:

(1) first and second quantum mechanical tunneling devices, each having an anode and a cathode;

(2) means connecting the anode of the first device and the cathode of the second device to a common junction;

(3) a positive clock pulse input terminal connected to the anode of the second device; and (4) a negative clock pulse input terminal connected to the cathode of the first device;

(b) means for supplying an input signal to the common junction of the first stage;

(c) means including a capacitor coupling the common junction of the first stage to the common junction of the second stage;

(d) clock pulse supply means for each stage for supplying to the respective clock pulse inputs thereof clock pulses which shift concurrently between a background condition in which the same background potential is supplied to both clock pulse inputs and an active condition in which a potential positive with respect to the background potential is supplied to the positive clock pulse input and a potential negative with respect to the background potential is supplied to the negative clock pulse input;

(e) said clock pulse supply means for the second stage having its pulses delayed with respect to the clock pulses for the first stage by a time shorter than the active condition of the first stage clock pulses so that the active condition of the second stage clock pulses overlaps the active condition of the first stage clock pulses;

(f) each said stage tending to shift during said active condition of the clock pulses to one of two stable states characterized by opposite polarities of the common junction with respect to the background potential;

(g) said first stage being effective during the portion of the active condition of its clock pulses prior to initiation of the active condition of the second stage clock pulses to charge said capacitor with a polarity determined by the particular stable state selected by the polarity of the input signal upon initiation of the active condition of the first stage pulses;

(h) said capacitor being effective during the overlapping active conditions of the clock pulses to hold the common junction of the second stage at said background potential;

(i) said capacitor discharging through said first stage after the active condition of the first stage clock pulses terminates, thereby swinging the polarity of the second stage common junction in a sense to establish the second stage in the stable state opposite to that previously established for the first stage.

References Cited in the file of this patent

UNITED STATES PATENTS

| | | |
|---|---|---|
| 2,580,771 | Harper | Jan. 1, 1952 |
| 2,642,526 | Gallay | June 16, 1953 |
| 3,078,376 | Lewin | Feb. 19, 1963 |

FOREIGN PATENTS

| | | |
|---|---|---|
| 1,246,094 | France | Oct. 3, 1960 |

OTHER REFERENCES

"The Tunnel Diode as a Logic Element," by Lewin et al. in 1960 International Solid State Circuits Conference, Feb. 10, 1960.